3,284,173
PREPARATION OF PLUTONIUM HEXAFLUORIDE
Jack Fischer, Lisle, Ill., assignor to the United States of America as represented by the United States Atomic Energy Commission
No Drawing. Filed Apr. 27, 1965, Ser. No. 451,366
2 Claims. (Cl. 23—326)

The invention described herein was made in the course of, or under, a contract with the United States Atomic Energy Commission.

This invention relates to a process of fluorinating plutonium oxide, plutonium tetrafluoride and/or plutonium oxyfluoride for the purpose of forming the more readily volatilizable plutonium hexafluoride.

The process of this invention is applicable to the recovery of the plutonium content from a plutonium-containing alumina mixture as it is obtained, for instance, in the processing of neutron-irradiated nuclear fuel material on a so-called fluidized bed wherein the "bed material" is alumina. (A fluidized bed is obtained by passing a gas upwardly through a bed of solid particles at a sufficient velocity to separate the particles from each other. In this condition a certain degree of freedom to move is imparted to the solid particles so that the solid-gas mixture behaves much like a liquid and has the ability to flow under the influence of a hydrostatic head.) The process is particularly valuable for the recovery of residual plutonium present on alumina, predominantly as plutonium tetrafluoride, after the uranium and the bulk of plutonium have been volatilized as the hexafluorides by fluorination with fluorine gas at about 450° C. The process also lends itself to the fluorination of $U_3O_8$.

The object of this invention is a fluorination process in which fluorination of plutonium oxide and/or lower fluorides to the hexafluoride takes place more readily and more quantatively than in the processes used heretofore, for instance, in that using fluorine gas, as described above.

It was found previously by the inventor and another that uranium dioxide can be fluorinated readily and at low temperatures and uranium hexafluoride be formed by bismuth pentafluoride. This process is mentioned in the Journal of the American Chemical Society, 81, 6377 (1959).

It has now been found that bismuth pentafluoride acts as a catalyst in the fluorination of plutonium dioxide, plutonium tetrafluoride, plutonyl fluoride and/or $U_3O_8$ with fluorine gas, this especially when the bismuth pentafluoride is present in statu nascendi, as is the case, for instance, when bismuth metal or bismuth trifluoride is contacted with fluorine gas.

The process of this invention thus comprises mixing bismuth metal or solid bismuth trifluoride with the uranium-oxide- or plutonium-oxide- or lower-fluoride-containing material to be treated, contacting the mixture with fluorine gas at between 450 and 600° C., whereby bismuth pentafluoride is formed, which in turn reacts with the fluorinatable material to form the hexafluorides, and separating the uranium hexafluoride and/or the plutonium hexafluoride together with the bismuth pentafluoride vapor formed for the recovery of the actinide fluorides and the separation and regeneration of the bismuth pentafluoride.

As mentioned, bismuth can be added in metallic form or as the trifluoride. The fluorine gas can be diluted with an inert gas, such as nitrogen, or else it can be used in undiluted form; the latter is preferable. In the catalytic reaction of the bismuth pentafluoride, bismuth trifluoride is formed back by reaction with the actinide compound, but the trifluoride is immediately reconverted to the pentafluoride by the fluorine gas. Bismuth pentafluoride is volatile at the reaction temperature and is therefore driven off with the actinide hexafluoride formed. The bismuth pentafluoride therefore has to be separated from the actinide hexafluoride by fractional condensation and has to be reduced to the trifluoride by known means. The separtion of the bismuth pentafluoride and its regeneration to the trifluoride are not part of the invention.

The quantity of the bismuth metal or bismuth trifluoride to be added is not critical. However, it was found that it is preferably added in a total quantity of between 0.2 and 10% by weight of the bed material, the exact amount depending on the actinide content of the bed material. This means that, as the bismuth trifluoride is converted during the reaction to the pentafluoride and driven off as such, the bismuth or bismuth trifluoride must be replenished. For the recovery of the normal quantities of residual plutonium from pretreated bed material, a total quantity of bismuth catalyst of about 3% is usually sufficient.

The process can be carried out with the material to be treated in sationary condition, or the material to be treated can be converted to a fluidized bed for better contact.

While for plutonium conversion to the hexafluoride a temperature range of between 450 and 600° C. can be used satisfactorily, for the fluorination of $U_3O_8$ the tempearture is best limited to the range of between 450 and 500° C..

In the following, an example is given to illustrate the process of this invention.

*Example*

An alumina bed material that had been pretreated with fluorine gas at 450° C. contained 0.18% by weight of residual plutonium, mostly in the form of plutonium tetrafluoride. It also contained fission product fluorides nonvolatile at 450° C. To 450 grams of this pretreated bed material one gram of powdered bismuth metal was admixed. The mixture was heated to 550° C., and undiluted fluorine gas was passed through the container containing the mixture at a flow rate of about 200 cc./min. The reaction was carried out for five hours, during which period the fluorine gas was recycled repeatedly through the reactor vessel. Analysis of the bed material after the reaction showed that the plutonium content had been reduced to 0.08% by weight.

It will be understood that the invention is not to be limited to the details given herein but that it may be modified within the scope of the appended claims.

What I claim is:

1. A process of removing a plutonium compound selected from the group consisting of plutonium dioxide, plutonium tetrafluoride and plutonyl fluoride from alumina, comprising admixing to the plutonium-containing alumina a bismuth catalyst selected from the group consisting of bismuth metal and bismuth trifluoride, bringing the temperature of the mixture to between 450 and 600° C., and passing fluorine gas over the mixture at said temperature, whereby plutonium hexafluoride is formed and volatilized.

2. The process of claim 1 whereby the bismuth catalyst is added in a quantity to result in a content of between 0.2 and 10% by weight of bismuth in the alumina mixture.

References Cited by the Examiner

AEC Document, ANL–6885, Reactor Development Program Progress Report, April 1964, pp. 58–59.

AEC Document, ANL–6900, Chemical Engineering Division Semiannual Report, January–June 1964, p. 150.

References Cited by the Applicant

AEC Report ANL–6742, Laboratory Investigations in Support of Fluid-Bed Fluoride Volatility Processes Part I. The Fluorination of Uranium Dioxide-Plutonium Dioxide Solid Solutions, R. L. Jarry et al. Preparation, Properties and Reactions of Bismuth Pentafluoride by Jack Fischer et al., J. Am. Chem. Soc., vol. 81, 1959, pp. 6375–6377.

L. DEWAYNE RUTLEDGE, *Primary Examiner.*

BENJAMIN R. PADGETT, *Examiner.*

S. TRAUB, *Assistant Examiner.*